United States Patent [19]

Yamane et al.

[11] Patent Number: 4,881,078

[45] Date of Patent: Nov. 14, 1989

[54] TRACKING SYSTEM WITH BEAM SWITCHING ANTENNA

[75] Inventors: Toshinobu Yamane; Akio Kuramoto; Ryuji Shimizu; Makoto Nakayama, all of Tokyo, Japan

[73] Assignee: NEC Corporation, Tokyo, Japan

[21] Appl. No.: 200,215

[22] Filed: May 31, 1988

[30] Foreign Application Priority Data

May 29, 1987 [JP] Japan .............................. 62-133808
Sep. 16, 1987 [JP] Japan .............................. 62-229606
Apr. 30, 1988 [JP] Japan .............................. 63-105516

[51] Int. Cl.⁴ .......................... G01S 13/00; H01Q 3/22
[52] U.S. Cl. ...................................... 342/155; 342/368
[58] Field of Search ............... 342/359, 368, 371, 372, 342/374, 439, 422, 425, 426, 427, 420, 74, 75, 77, 79, 81, 155, 157; 343/754, 757

[56] References Cited

U.S. PATENT DOCUMENTS 3,725,937 4/1973 Schreiber ............................. 342/155
3,969,729 7/1976 Nemit .................................. 342/374

Primary Examiner—Thomas H. Tarcza
Assistant Examiner—Gregory C. Issing
Attorney, Agent, or Firm—Sughrue, Mion, Zinn, Macpeak & Seas

[57] ABSTRACT

In a tracking system for a stationary satellite, a phased array is used for an antenna mounted on an automobile. The phased array antenna has a sharp beam which is switched between two different directions in azimuth. The antenna beam is switched between the two directions periodically by control of phase constants in a feeding circuit of the antenna and comparison is made in strength between signals received before and after the beam switching to obtain an error signal as an azimuth error signal. Then, the antenna is mechanically moved in azimuth according to the azimuth error signal until the azimuth error signal becomes zero. In a case the antenna beam is also switched between two directions in elevation, the antenna beam is switched in elevation during an interval between successive two times of the beam switching operation in azimuth and detects a difference in strength of signals received before and after the switching in elevation to thereby produce the difference as an elevation error signal. The antenna is mechanically moved in elevation according to the elevation error signal until the elevation error signal becomes zero.

12 Claims, 8 Drawing Sheets

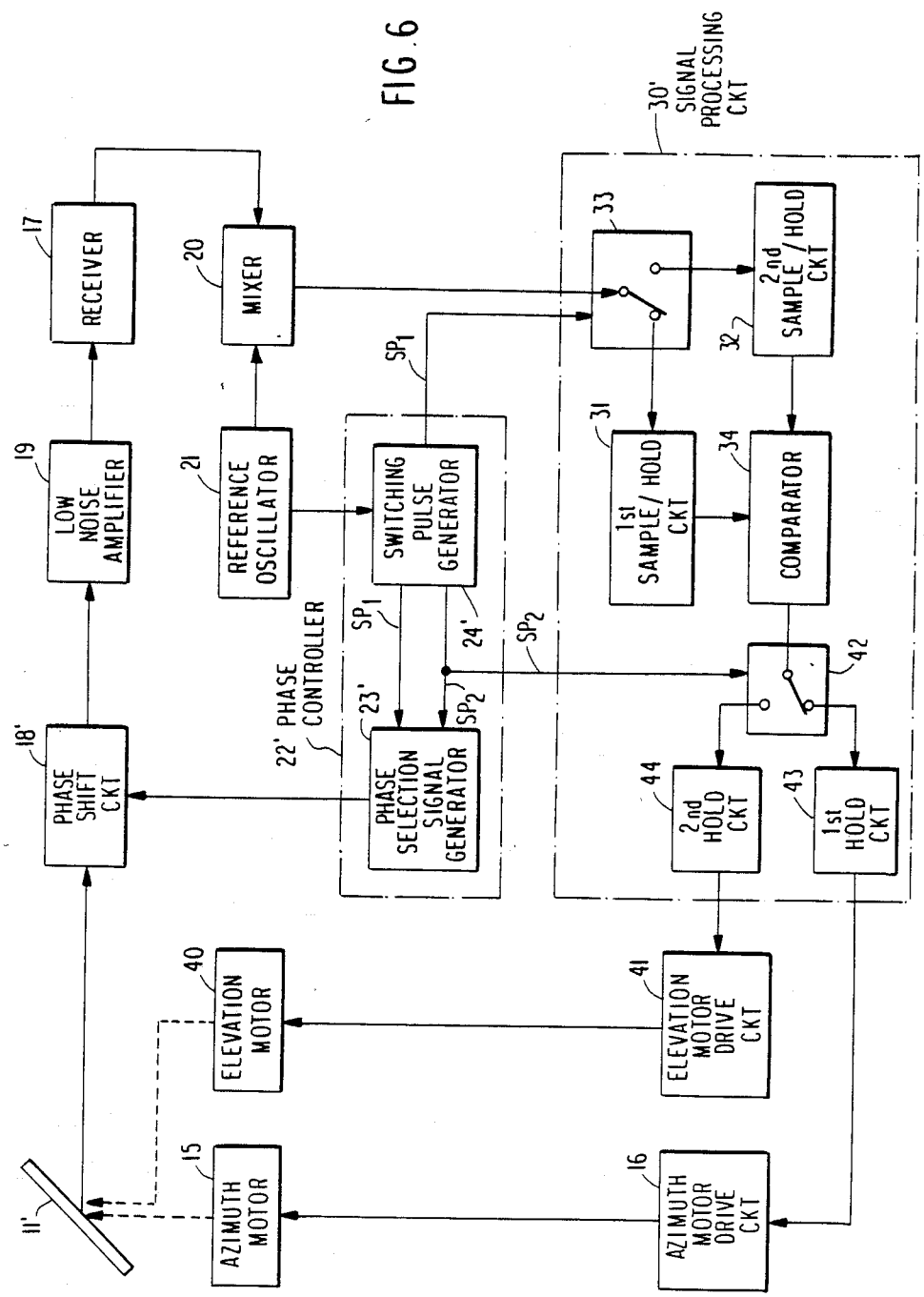

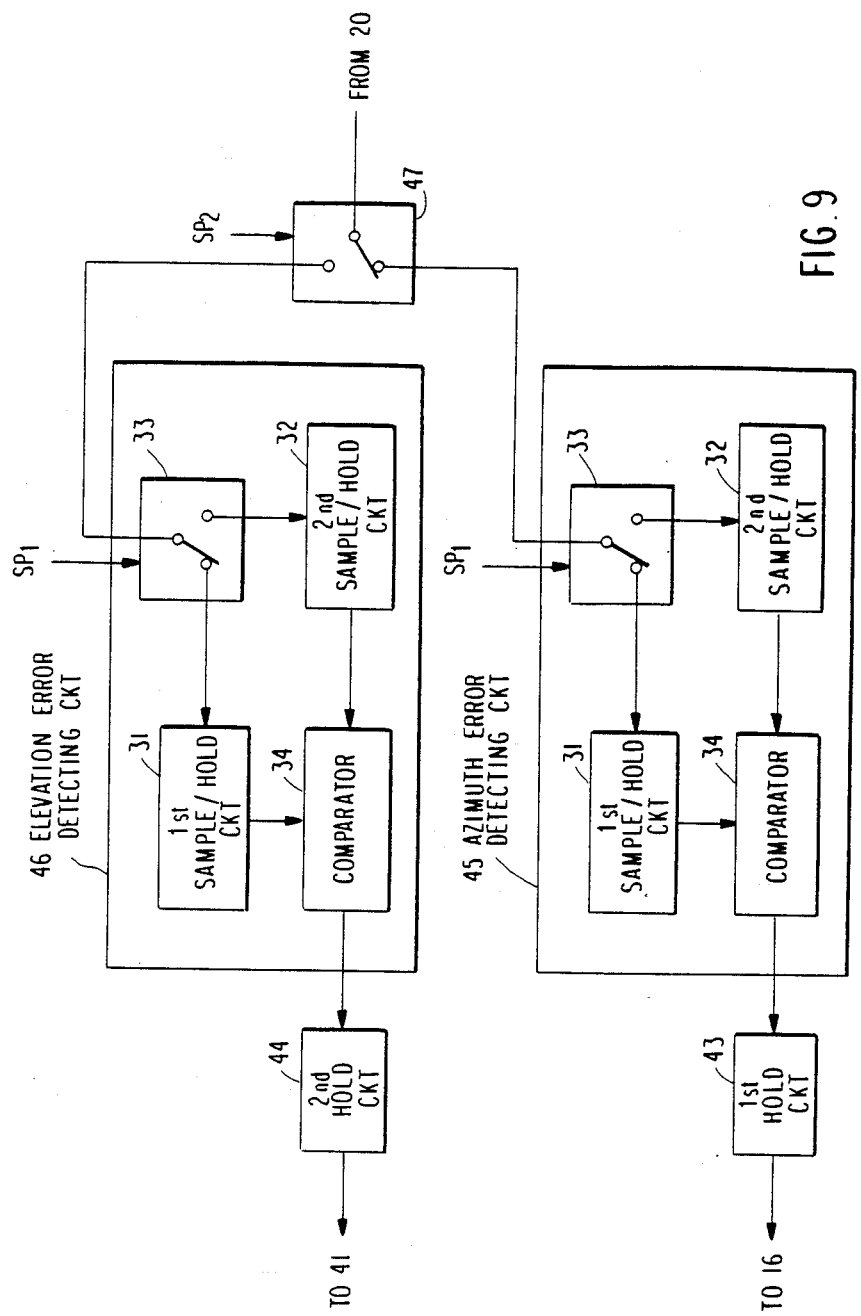

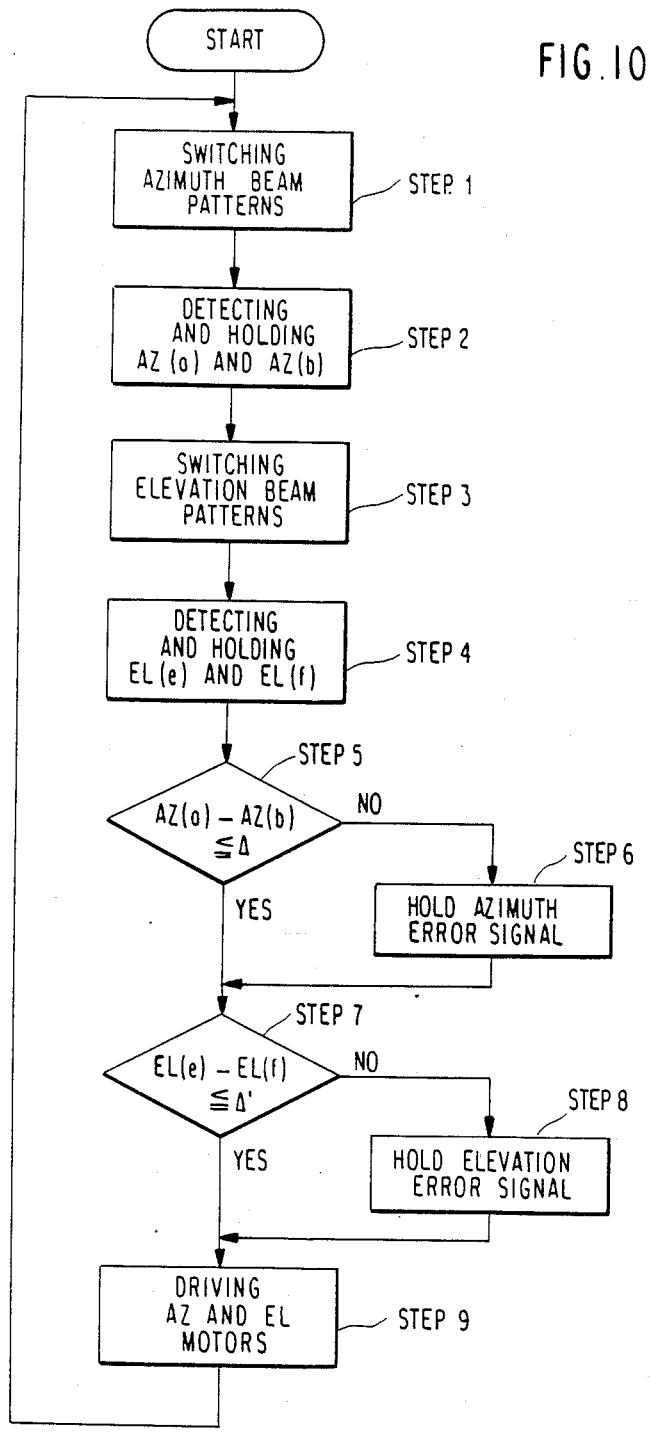

TRACKING SYSTEM WITH BEAM SWITCHING ANTENNA

BACKGROUND OF THE INVENTION

1. Field of the Invention

The present invention relates to a tracking system for tracking an electromagnetic energy source, for example, a communication satellite.

2. Description of the Prior Art

In a mobile telecommunication system wherein communication is performed between a telephone set installed in an automobile and a subscriber's station or another automobile through a stationary communication satellite or a repeater satellite. In the mobile telecommunication system, the automobile has an antenna which must be automatically controlled to track the satellite.

As a tracking system for tracking an electromagnetic energy source such as the satellite, a conical scanning system is known in the prior art where a beam of the antenna nutates or rotates in a cone shape while an electromagnetic wave from the satellite is received at the antenna as a receive signal. An angular error of the antenna beam from the satellite is detected as an error voltage from an amplitude modulation component in the receive signal. The antenna is moved until the error voltage becomes zero.

However, the conical scanning system has a disadvantage that the antenna has a complicated mechanism for rotating the antenna beam in a cone shape.

Another known tracking system is a step tracking system wherein the antenna is mechanically moved by a small angle in a direction to compare the receive signal strength before and after the move. A direction of the next move is decided according to the receive signal strength. Then, the antenna is again moved by the small angle in the decided direction. The similar operation is repeated until the maximum receive signal strength is obtained.

The step tracking system has a problem in a tracking speed. This is because the receive signal strength is decided after integrating the receive signal over a predetermined time period. Further, any compensator is necessary for compensating any displacement of the automobile with the antenna during the integrating time period.

SUMMARY OF THE INVENTION

Accordingly, it is an object of the present invention to provide a tracking system for tracking an electromagnetic energy source which is simple in a moving mechanism of an antenna and excellent in tracking speed.

It is another object of the present invention to provide such a tracking system having an initial acquisition system which is simple in the arrangement.

The present invention is applicable to a tracking system for tracking an electromagnetic energy source comprises an antenna for receiving the electromagnetic energy, receiver means coupled with the antenna through feeding means for producing a signal of the electromagnetic energy received by the antenna as a receive signal, and moving means for mechanically and angularly moving the antenna so as to point the antenna to the electromagnetic energy source to thereby maximize the receive signal strength. The tracking system according to the present invention, the antenna has an antenna beam which is changeable in direction in response to variation of an electric characteristic in the feeding circuit. The system comprises selection signal generating means for producing a first and a second selection signal alternatingly, and electric variable means coupled in the feeding means and being variable in an electric characteristic from one to another of a first and a second value. The antenna beam is directed in a first direction when the electric variable means has the first value, and is directed in a second direction when the electric variable means has the second value. The first and the second directions have a predetermined small angular difference. The electric variable means has the first and the second values alternatingly in response to the first and the second selection signals alternatingly produced to thereby switch the antenna beam from one to the other of the first and the second directions. The system further comprises detection means coupled with the receiver means for detecting the receive signal to produce a detected signal, and processing means coupled with the detection means for deciding the detected signal strength before and after switching of the antenna beam to produce an error signal. The moving means is coupled with the processing means and, in response to the error signal, mechanically and angularly moves the antenna to thereby reduce the error signal.

In an aspect of the present invention, the antenna beam has a pattern which is sharp in azimuth and broad in elevation. The first and the second directions is different from one another in azimuth. The moving means moves the antenna in azimuth.

In another aspect of the present invention, the system comprises first and second moving means for mechanically move the antenna in azimuth and elevation, respectively. The selection signal generating means produces a first, a second, a third, and a fourth selection signal alternatingly. The electric variable means is variable in an electric characteristic from one to another of a first, a second, a third, and a fourth value. The antenna beam is directed in a first direction when the electric variable means has the first value and is directed in a second direction when the electric variable means has the second value. The first and the second directions has a predetermined small angular difference in azimuth. The antenna beam is directed in a third direction when the electric variable means has the third value and is directed in a fourth direction when the electric variable means has the fourth value. The third and the fourth directions have a predetermined small angular difference in elevation. The electric variable means has the first, the second, the third, and the fourth values alternatingly in response to the first, the second, the third, and the fourth selection signals alternatingly produced to thereby switch the antenna beam from one to another of the first, the second, the third, and the fourth directions. The processing means is coupled with the detection means and decides the detected signal strength before and after switching of the antenna beam to produce an azimuth error signal and an elevation error signal. The first moving means is coupled with the processing means and, in response to the azimuth error signal, mechanically and angularly moves the antenna in azimuth to thereby reduce the azimuth error signal. The second moving means is coupled with the processing means and, in response to the elevation error signal, mechanically and angularly moves the antenna in elevation to thereby reduce the elevation error signal.

BRIEF DESCRIPTION OF THE DRAWINGS:

FIG. 6 is a block diagram view of a tracking system according to another embodiment;

FIG. 9 is a modification of the signal processing circuit in FIG. 6; and

FIG. 10 is a chart illustrating the tracking operation in the modified system of FIG. 9.

Figure 1:
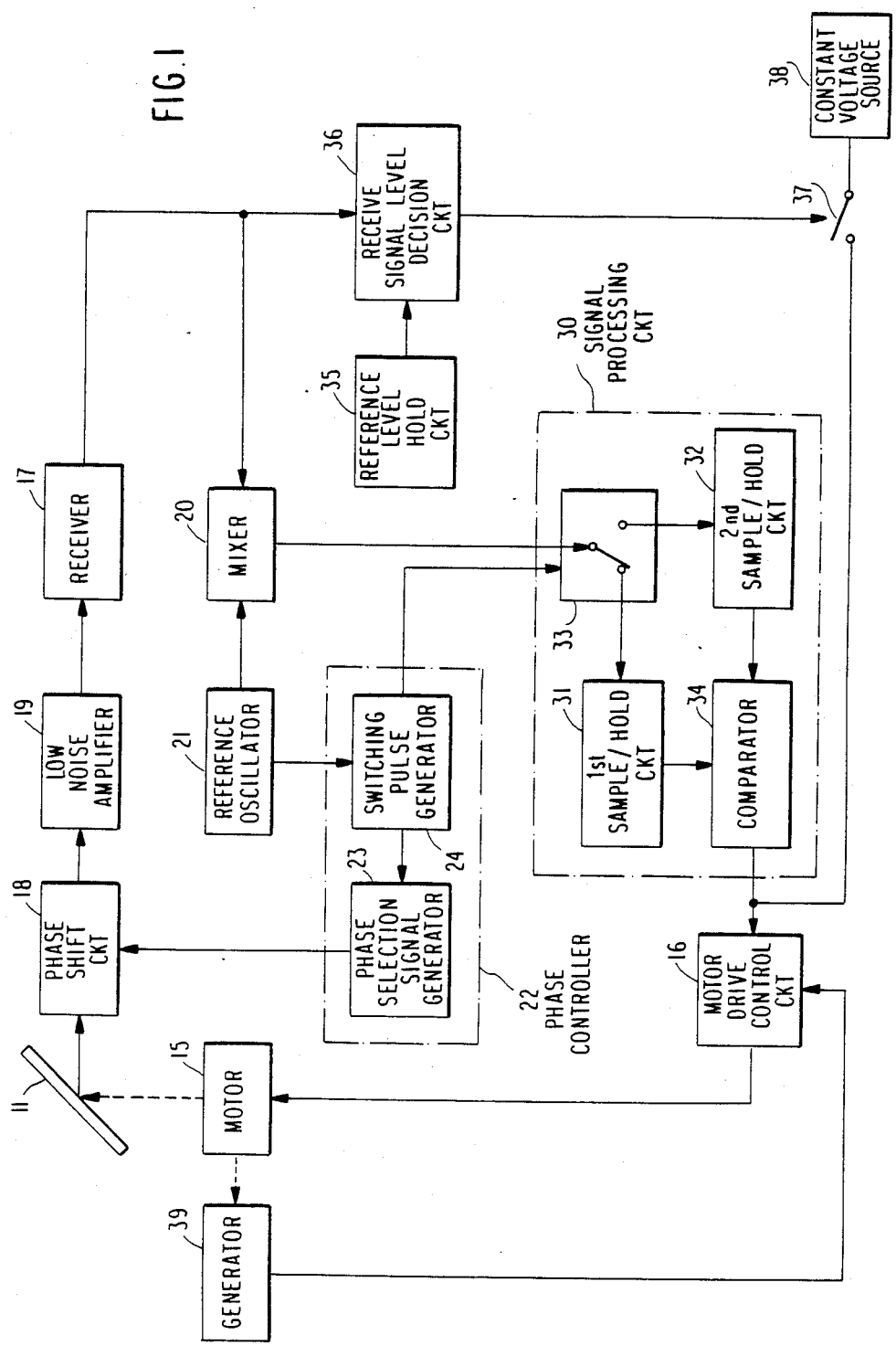
FIG. 1 is a block diagram view of a tracking system according to an embodiment of the present invention.

DESCRIPTION OF PREFERRED EMBODIMENTS:

Referring to FIG. 1, the tracking system shown therein comprises an antenna 11.

Figure 2:
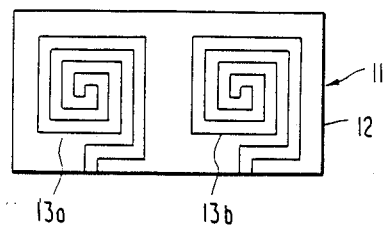
FIG. 2 is a plan view of an antenna in FIG. 1.

Referring to FIG. 2, the antenna is a radiator which comprises a dielectric plate 12 and two antenna elements 13a and 13b arrayed on the dielectric plate 12. Each of the antenna elements 13a and 13b are formed in a spiral form as a microstrip line on the dielectric plate 12. A ground plate is formed on a back surface of the dielectric plate 12 as shown at 14 in FIG. 2a.

Figure 2A:
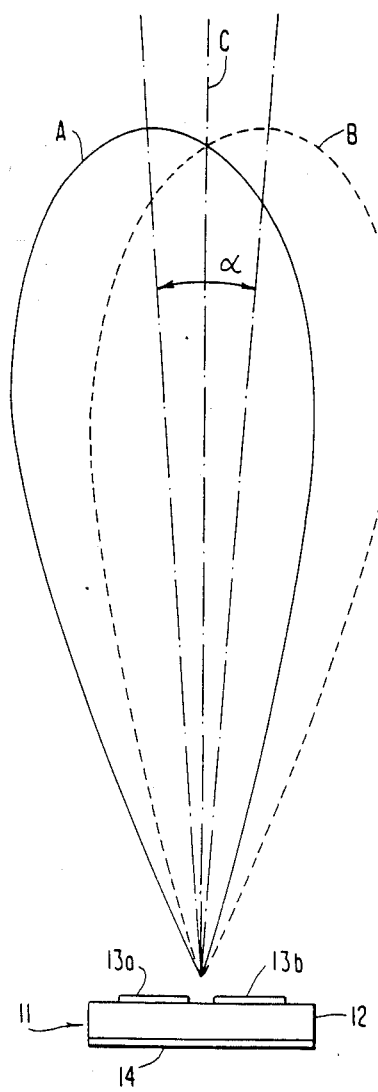
FIG. 2a is a view illustrating a beam pattern of the antenna used in FIG. 2.

Referring to FIG. 2a, the antenna 11 has a resultant directivity of the two antenna elements 13a and 13b which is a sharp directivity as shown in a direction C in azimuth but has a broad directivity in elevation. In the azimuth plane, a beam of the antenna 11 is switched from one to another of two beam patterns A and B by controlling phase shift circuit portions in a feeding circuit of the antenna 11, as will later be described. Thus, the antenna 11 is a beam switching antenna and is of, so called, a phased array type.

In the present embodiment, the angular difference between the two beam patterns A and B is determined at a small angle which is preferably about 1/10 of a half-power angle of the antenna beam.

Returning to FIG. 1, the antenna 11 is coupled with a motor or an azimuth motor 15 which is coupled with a motor drive and control circuit 16. The motor 15 is rotated under control of the motor drive and control circuit 16 so that the antenna 11 is moved in azimuth to track a stationary satellite (not shown).

The system further comprises a receiver 17 coupled to the antenna 11 through a feeder including a phase shift circuit 18 and a low noise amplifier 19. The phase shift circuit 18 collectively represents two phase shift circuit portions for the two antenna elements 13a and 13b, respectively. The receiver 17 receives a radio wave from the satellite through the antenna 11, the phase shift circuit 18 and the low noise amplifier 19 and produces a receive signal which is, for example, an intermediate frequency signal. The receive signal is applied to a mixer 20 and mixed with a reference signal from a reference oscillator 21. Thus, the mixer 20 carries out a coherent detection of the receive signal and produces a detected signal.

The system further comprises a phase controller 22 for controlling phase constants in the phase shift circuit 18. The phase controller 22 comprises a phase selection signal generator 23 for generating a phase selection signal and a switching pulse generator 24 for generating a series of switching pulses so as to control the phase selection signal generator 23. That is, the switching signal generator 24 is responsive to the reference signal from the reference signal oscillator 21 and generates the series of switching pulses synchronous with the reference signal. The phase selection signal 23 comprises a first and a second designating signal for designating a first and a second group of phase constants of the phase shift circuit 18, in detail, a first and a second group of phase constants of the two phase shift circuit portions, respectively, which is alternatingly generated in synchronism with the series of switching pulses. That is, the first designating signal is generated from the phase selection signal generator 23 in response to first one of the series of the switching pulses, and the second designating signal is generated in response to the next succeeding or second one of the series of switching pulses. Then, the first designating signal is again generated in response to the further next succeeding or third one of the series of switching pulses. Thus, the phase shift circuit 18 is controlled to alternatingly have the first group of phase constants and the second group of phase constants. Accordingly, the beam pattern of the antenna 11 is alternatingly switched from one to another of the beam patterns A and B shown in FIG. 2a.

Figure 3:
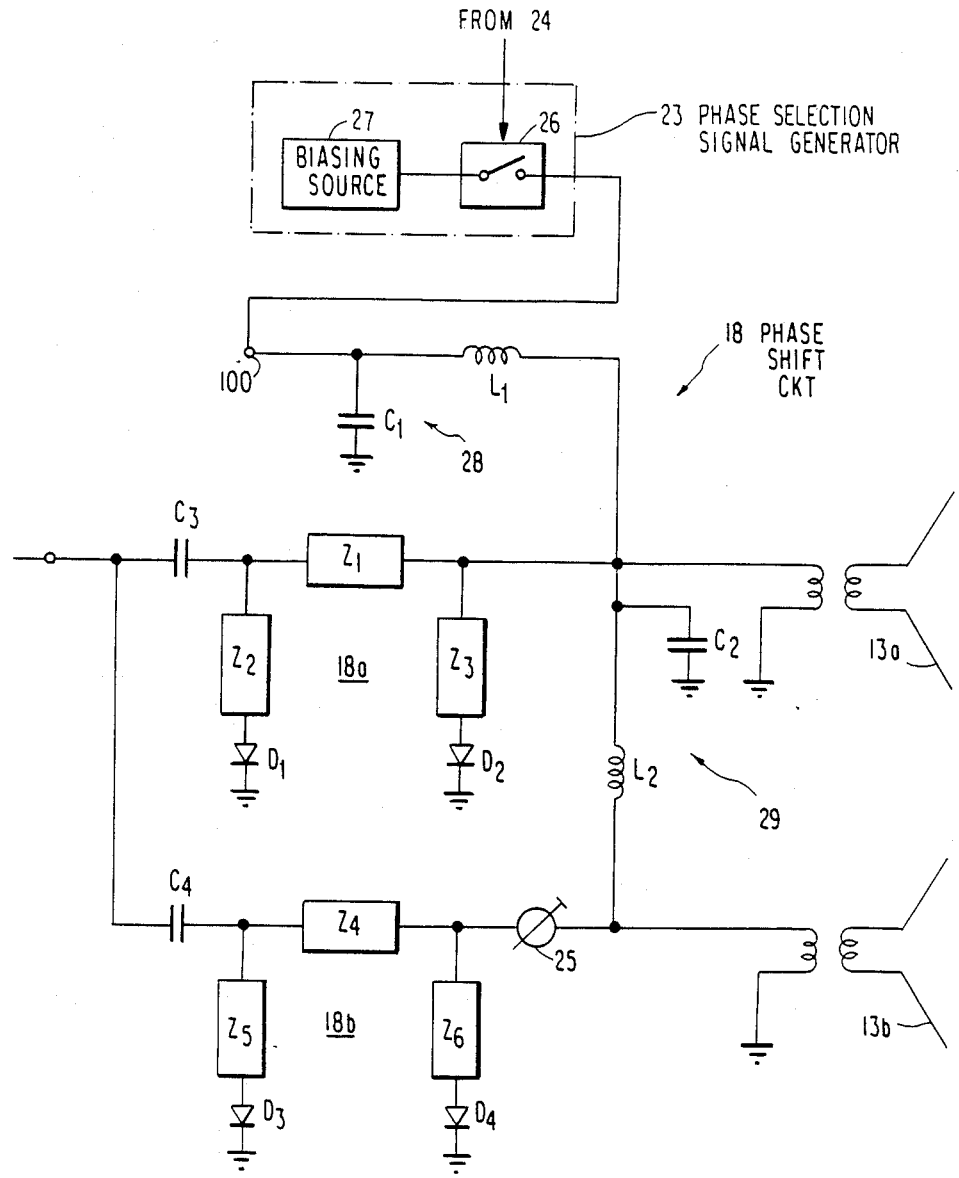
FIG. 3 is a diagram view of a phase selection signal generator, a phase shift circuit, and the antenna in FIG. 1.

Referring to FIG. 3, the phase shift circuit 18 comprises the first phase shift circuit portion 18a for the first antenna element 13a and a second phase shift circuit portion 18b for the second antenna element 13b. The first phase shift circuit portion 18a comprises three impedance elements $Z_1$ through $Z_3$ which form a $\pi$ shape circuit. The second phase shift circuit portion 18b comprises a phase shifter 25 and three impedance elements $Z_4$ through $Z_6$ which form another $\pi$ shape circuit. Impedance elements $Z_2$, $Z_3$, $Z_5$, and $Z_6$ are grounded through four PIN diodes $D_1$, $D_2$, $D_3$, and $D_4$, respectively. When PIN diodes $D_1$ through $D_4$ are conductive, the first and second phase shift circuit portions 18a and 18b have specific phase constants, respectively, as the first group of phase constants. When PIN diodes $D_1$ through $D_4$ are not conductive, the phase constants of the first and the second phase shift circuit portions 18a and 18b have particular phase constants, as the second group of phase constants, different from the specific phase constants, respectively. Those impedance elements $Z_1$ through $Z_6$ are predetermined so that the antenna 11 has the first beam pattern A when PIN diodes $D_1$ through $D_4$ are conductive, while the antenna 11 has the second beam pattern B when PIN diodes $D_1$ through $D_4$ are not conductive.

The phase selection signal generator 23 comprises a first switching circuit 26 and a biasing source 27. The first switching circuit 26 alternately turns on and off in response to the switching pulses from the switching pulse generator 24. The biasing source 27 generates a bias voltage for making those PIN diodes $D_1$ through $D_4$ conductive. The biasing source 27 is coupled with the first phase shift circuit portion 18a through the first switching circuit 26 and a first low pass filter 28 comprising a capacitor $C_1$ and an inductor $L_1$. The biasing source 27 is also coupled with the second phase shift circuit portion 18b through the first switching circuit 26, the first low pass filter 28, and a second low pass filter 29 comprising a capacitor $C_2$ and an inductor $L_2$. Accordingly, when the first switching circuit 26 turns on, the PIN diodes $D_1$ through $D_4$ are conductive so that the antenna 11 has the first beam pattern A. On the other hand, when the first switching circuit 26 turns off, the PIN diodes $D_1$ through $D_4$ are not conductive so that the antenna 11 has the second beam pattern B. Thus, the antenna alternatingly has the first and the second beam patterns A and B in synchronism with the series of switching pulses from the switching pulse generator 24.

In FIG. 3, capacitors $C_3$ and $C_4$ are coupling capacitors.

Returning to FIG. 1, the system further comprises a signal processing circuit 30 for processing the detected signal to decide a difference in the receive signal strength before and after switching from one to the other of the two beam patterns A and B of the antenna 11. The signal processing circuit 30 has a first and a second sample and hold circuit 31 and 32 and a second switching circuit 33. The second switching circuit 33 connects the mixer 20 to the first and the second sample and hold circuits 31 and 32, alternatingly, in response to the series of switching pulses from the switching pulse generator 24. Therefore, the detected signal from the mixer 20 is applied to the first and the second sample and hold circuits 31 and 32, alternatingly. Each of the first and second sample and hold circuits 31 and 32 samples the detected signal applied thereto and holds signal strength sampled. The signal strength held in the first and the second sample and hold circuits 31 and 32 are compared at a comparator 34 to produce an error signal. The error signal is applied to the motor drive and control circuit 16 to drive motor 15 so as to move the antenna 11.

As described above, the first and the second beam patterns A and B of the antenna 11 are alternatingly switched from one to the other in synchronism with the series of switching pulses from the switching pulse generator 24. While the first and the second sample and hold circuits 31 and 32 are alternatingly connected with the mixer 20 through the second switching circuit 33 in synchronism with the series of switching pulses from the switching pulse generator 24. Therefore, the first sample and hold circuit 31 holds the signal strength as a first held strength AZ(a) when antenna beam is switched to, for example, the first beam pattern A, while the second sample and hold circuit 32 holds the signal strength as a second held strength AZ(b) when the antenna beam is switched to the second beam pattern B. The comparator 34 compares the first and the second held strength and produces a strength difference therebetween (AZ(a)−AZ(b)) as the error signal. When AZ(a) is larger than AZ(b), the error signal is positive. Then, the motor drive and control circuit 16 responsive to the positive error signal drives the motor 15 in a direction so that the antenna moves in azimuth in a rotational direction from the beam pattern B to beam pattern A. On the contrary, the error signal is negative when AZ(a) is smaller than AZ(b). Then, the motor drive and control circuit 16 responsive to the negative error signal moves the motor 15 in an opposite direction so that the antenna moves in azimuth in an opposite rotational direction. The movement of the antenna is continued until the error signal becomes zero. Thus, the antenna 11 is always directed to the satellite.

In the tracking system as described above, the tracking operation stops when the signal strength received at the antenna is undesirably lowered by interruption of any object. In an application for the mobile telecommunication system, when the automobile having the antenna moves during the interruption by any object, the direction of the antenna is apart from the satellite and the tracking operation of the satellite cannot be performed even after the interruption finishes.

Figure 4:
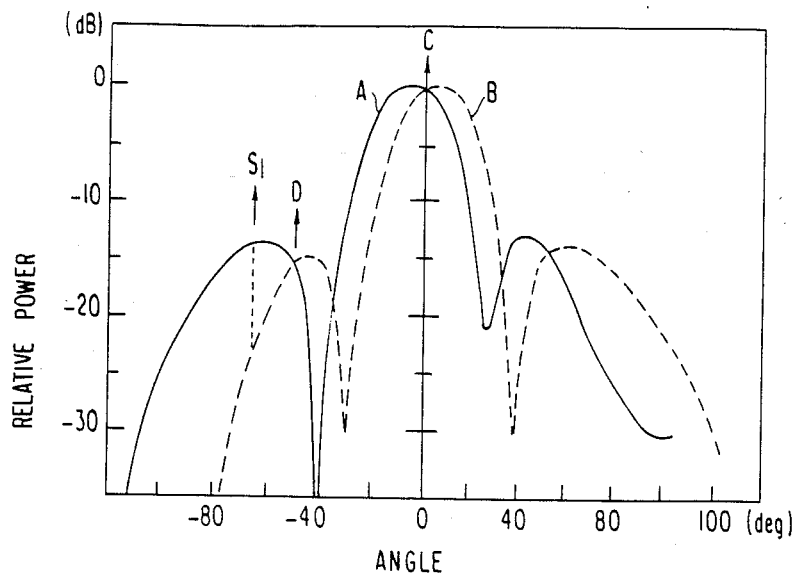
FIG. 4 is a view illustrating a radiation pattern of the antenna in FIG. 1.
Figure 5:
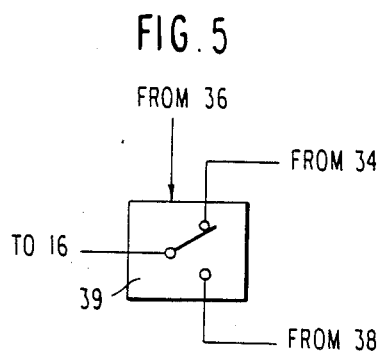
FIG. 5 is a modification of a portion in the embodiment of FIG. 1.

Referring to FIG. 4, the antenna 11 has a radiation pattern, for example, as shown in the figure. A solid line A illustrates a relative power in relation to the azimuth angle when the antenna 11 has the beam pattern A in FIG. 2a, and a dashed line B illustrates a relative power in relation to the azimuth angle when the antenna 11 has the other beam pattern B in FIG. 2a. The radiation pattern has a major lobe in the maximum radiation direction C and two side lobes at both sides of the major lobe. Assuming that the satellite is in a direction shown at an arrow $S_1$ on the side lobe when the interruption finishes, the acquisition of the satellite is performed on the side lobe and the satellite is acquired in an azimuth angle D. Therefore, the maximum radiation direction C of the antenna is disadvantageously offset from the direction D of the satellite.

In order to solve the problem, the system of FIG. 1 further comprises a reference level hold circuit 35 and a receive signal level decision circuit 36. The reference level hold circuit 35 holds a reference signal level of a predetermined level which is preferably selected to be slightly larger than the maximum level of the side lobe. The receive signal level decision circuit 36 compares a level of the receive signal from the receiver 17 with the reference signal level and produces a control signal when the receive signal level is decided lower than the reference signal level. The control signal is applied to a switch 37 and makes the switch 37 turn on. When the switch 37 turns on, a constant voltage is applied to the motor drive and control circuit 16 from a constant voltage source 38. Then, the motor is rotated in a predetermined direction at a constant speed. An electric generator 39 is coupled to the motor 15 and generates an alternating voltage signal having a frequency corresponding to the rotation speed of the motor 15. The alternating voltage signal is applied to the motor drive and control circuit 16 which, in turn, controls the motor 15 to make the rotating speed of the motor 15 constant according to the alternating voltage signal. When the major lobe of the antenna 11 is directed to the satellite and when the receive signal level is larger than the reference signal level in the reference level hold circuit 35, the receive signal level decision circuit 36 stops the control signal. Then, the switch 37 turns off and the supply of the constant voltage is stopped for the motor drive and control circuit 16. Thereafter, the antenna 11 is moved and controlled according to the error signal from the comparator 34 and the tracking operation of the satellite is performed in the manner as described above.

In the embodiment of FIG. 1, description has been made in connection with that the antenna 11 is moved in azimuth under control of the error signal. However, it will be understood by those skilled in the art that the antenna can be moved in elevation according to the error signal when the beam patterns A and B of the antenna 11 are sharp in elevation but broad in azimuth.

Referring to FIG. 6, another embodiment is shown wherein an antenna 11' is moved in azimuth and in elevation for tracking the satellite. Similar portions are represented by the same reference numerals in FIG. 1 and description thereto is omitted for the purpose of simplification of description.

In the present embodiment, the antenna 11' is similar to the antenna 11 shown in FIG. 2 but has four antenna elements (13'a through 13'd shown in FIG. 7) of microstrip lines similar to antenna elements 13a and 13b in FIG. 2. Those antenna elements are arranged in matrix.

Figure 7:
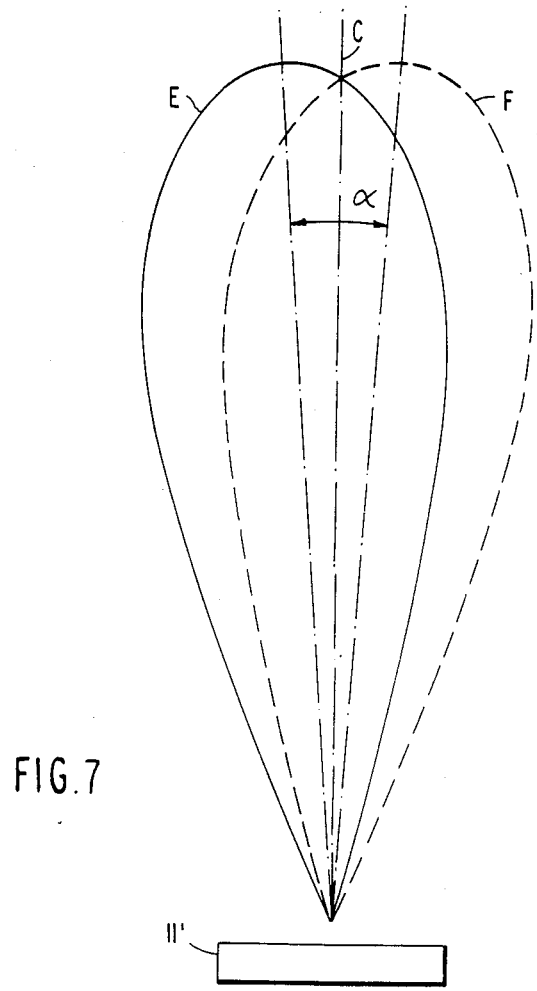
FIG. 7 is a view illustrating a beam pattern of an antenna used in FIG. 6.

A beam of the antenna 11' has two first and second sharp beam patterns A and B in azimuth similar to those in FIG. 2a which are switched by variation of phase constants of phase shift circuit portions for the antenna elements and has other two third and fourth sharp beam patterns E and F in elevation as shown in FIG. 7 which are also switched from one to the other by variation of phase constants of those phase shift circuit portions.

The antenna feeding circuit has five phase shift circuit portions for the four antenna elements as will later be described in connection with FIG. 8. A phase shift circuit 18' collectively represents the five phase shift circuit portions.

The antenna 11' is coupled with an elevation motor 40 driven by an elevation motor drive circuit 41 in addition to the azimuth motor 15 driven by the azimuth motor drive circuit 16. Thus, the antenna 11' is moved in azimuth and elevation by those motors 15 and 40.

A phase controller 22' is similar to the phase controller 22 in FIG. 1 and generates a phase selection signal. But, the phase selection signal comprises four signals for designating the first and second azimuth beam patterns A and B, respectively, and signals for designating the third and fourth elevation beam patterns E and F, respectively. Those designating signals are alternatingly produced from a phase selection signal generator 23' under control of two first and second series of switching pulses $SP_1$ and $SP_2$ from a switching pulse generator 24'.

The switching pulse generator 24' generates the first series of switching pulses $SP_1$ in response to and in synchronism with the reference signal from the reference oscillator 21. The first series of switching pulses $SP_1$ controls designation of two beam patterns in each of azimuth and elevation.

Further, the switching pulse generator 24' divides the reference signal by a dividing ratio of $\frac{1}{2}$ and produces a pulse signal having a divided frequency as the second series of switching pulses $SP_2$ in synchronism with the reference signal. The second series of switching pulses $SP_2$ controls designation of the azimuth and the elevation.

Thus, the azimuth designation and the elevation designation are alternately switched in response to the second series of switching pulses $SP_2$. When the azimuth is designated by first one of the second series of switching pulses $SP_2$, the first azimuth beam pattern A and the second azimuth beam pattern B are alternately designated by successive two of the first switching pulses $SP_1$. When the elevation is designated by the next successive or second one of the second series of switching pulses $SP_2$, the third elevation beam pattern E and the fourth elevation beam pattern F are alternately designated by successive two of the first series of switching pulses $SP_1$.

Figure 8:
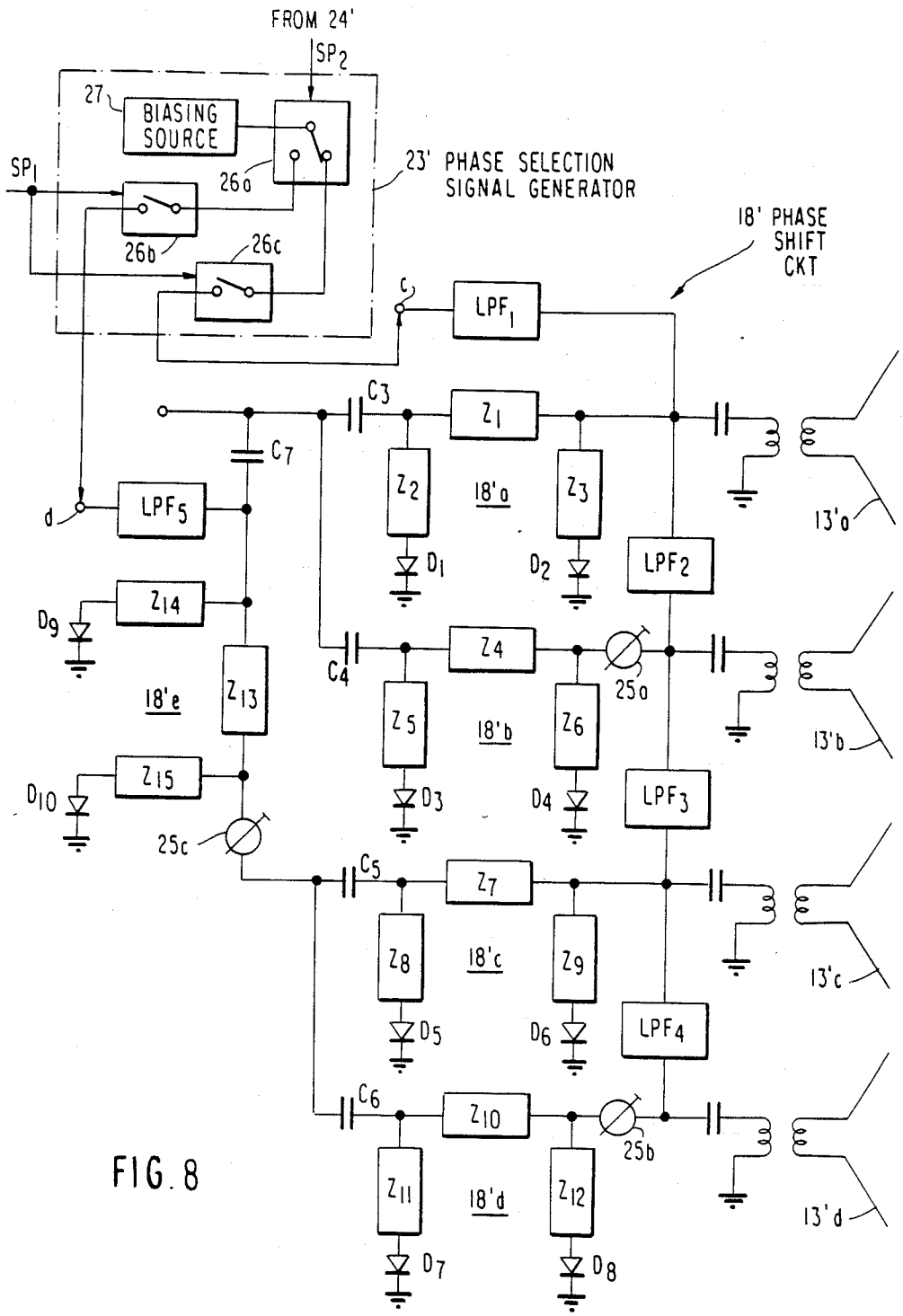
FIG. 8 is a diagram view of a phase selection signal generator, a phase shift circuit, and the antenna in FIG. 6.

Referring to FIG. 8, two antenna elements 13'a and 13'b are arranged adjacent to each other in an azimuth plane and other two antenna elements 13'c and 13'd are also arranged adjacent to each other in another azimuth plane. Two antenna elements 13'a and 13'c are arranged adjacent to each other in an elevation plane and other two antenna elements 13'b and 13'd are also arranged adjacent to each other in another elevation plane. Four phase shift circuit portions 18'a through 18'd are formed by those impedance elements $Z_1$ through $Z_{12}$, PIN diodes $D_1$ through $D_8$, and phase shifters 25a and 25b as shown in FIG. 8 in the feeding circuit for the four antenna elements 13'a through 13'd. Further, another phase shift circuit portion 18'e is formed by three impedance elements $Z_{13}$ through $Z_{15}$, two PIN diodes $D_9$ and $D_{10}$ and another phase shifter 25c as shown in FIG. 8 in a common feeding circuit for the antenna elements 13'c and 13'd. Those impedances $Z_1$ through $Z_{15}$ are determined so that the antenna 11' has the first azimuth beam pattern A when diodes $D_1$ through $D_8$ are not conductive during diodes $D_9$ and $D_{10}$ are not conductive, while the antenna having the second azimuth beam pattern B when diodes $D_1$ through $D_8$ are conductive during diodes $D_9$ and $D_{10}$ are not conductive, the antenna having the third elevation beam pattern E when the diodes $D_9$ and $D_{10}$ are not conductive during diodes $D_1$ through $D_8$ are not conductive, and the antenna having the fourth elevation beam pattern F when the diodes $D_9$ and $D_{10}$ are conductive during diodes $D_1$ through $D_8$ are not conductive.

Thus, the first through fourth patterns A, B, E, and F are switched by controlling bias voltages for the PIN diodes $D_1$ through $D_{10}$.

In the present embodiment, the first and the third beam patterns A and E are directed in a common direction when all of the diodes $D_1$ through $D_{10}$ are not conductive.

The phase selection signal generator 23' comprises the biasing source 27 for supplying the bias voltage of each of diodes $D_1$ through $D_{10}$ and three switching circuits 26a, 26b, and 26c. The switching circuit 26a is controlled by the second series of switching pulses $SP_2$ and alternatingly supplies the bias voltage from the biasing source 27 to the other switching circuits 26b and 26c. Each of the switching circuits 26b and 26c is turned on and off alternately in response to the first series of switching pulses $SP_1$. The switching circuit 26b is connected to the phase shift circuit portion 18'e through a low pass filter LPF5. The switching circuit 26c are connected to phase shift circuit portions 18'a through 18'd through one or more low pass filters LPF1 through LPF4 as shown in the figure. Therefore, azimuth/elevation selection and beam pattern selection can be performed under control of the first and second series of switching pulses $SP_1$ and $SP_2$.

Returning to FIG. 6, a signal processing circuit 30' comprises the first and second sample and hold circuits 31 and 32, the switching circuit 33, and the comparator 34 similar to the signal processing circuit 30 in FIG. 1. The processing circuit 30' further comprises another switching circuit 42 and first and second hold circuits 43 and 44. The switching circuit 42 is controlled by the second series of switching pulses $SP_2$ and connects the comparator 34 to the first and second hold circuits 43 and 44, alternately. The first and second hold circuits 43 and 44 are connected to the azimuth motor drive circuit 16 and the elevation motor drive circuit 41, respectively.

In the arrangement of the system, when the azimuth is selected by the second series of switching pulses $SP_2$, the comparator 34 is connected to the first hold circuit 43 through the switching circuit 42 under control of the second series of switching pulses $SP_2$. While, the first and second azimuth beam patterns A and B are switched from one to the other by the first series of switching pulses $SP_1$. Accordingly, the first and the second sample and hold circuits 31 and 32 hold the signal strengths AZ(a) and AZ(b) for the first beam pattern A and the second beam pattern B, respectively, in the similar manner as in FIG. 1. The azimuth error signal (AZ(a)−AZ(b)) is produced at the comparator 34 and applied to the first hold circuit 43 through the switching circuit 42. The azimuth error signal is held therein. Then, when the elevation is designated by the next succeeding one of the second series of switching pulses $SP_2$, the third and the fourth beam patterns E and F are successively selected by the two successive pulses of the first series of switching pulses $SP_1$. Accordingly, the first sample and hold circuit 31 samples the receive signal and holds a signal strength EL(e) when the third beam pattern E is selected, while the second sample and hold circuit 32 samples the receive signal and holds a signal strength EL(f) when the fourth beam pattern F is selected. The comparator 34 compares the both of the signal strength EL(e) and EL(f) and produces a strength difference (EL(e)−EL(f)) as the elevation error signal. The elevation error signal is supplied to the second hold circuit 44 through the switching circuit 42.

Accordingly, the azimuth motor 15 and the elevation motor 40 are moved by the azimuth motor drive circuit 16 and the elevation motor drive circuit 41 in response to the azimuth and elevation error signals held in the first and the second hold circuits 43 and 44.

The similar operation is continued until each of the error signals becomes zero. Thus, the satellite is tracked by the antenna 11′.

Referring to FIG. 9, two circuits 45 and 46 each comprising first and second sample and hold circuits 31 and 32, the switching circuit 33 and the comparator 34 can be used for detecting the azimuth and the elevation error signals, respectively, in place of common use of a single circuit. In the case, a switching circuit 47 is provided on the output of the mixer 20 and is operatively corresponding to the switching circuit 42.

In operation, the azimuth is selected and the first and second beam patterns A and B are switched from one to the other at step 1 in FIG. 10, as described above. Then, the first and second sample and hold circuits 31 and 33 in the azimuth circuit 45 sample and holds AZ(a) and AZ(b), respectively, at step 2 in FIG. 10. Next, the elevation is selected and the third and fourth beam patterns are switched from one to the other at step 3 in FIG. 10. Then, the first and second sample and hold circuits 31 and 32 in the elevation circuit 46 sample and hold EL(e) and EL(f) at step 4 in FIG. 10. At step 5 in FIG. 10, comparator 34 in the azimuth circuit 45 compares AZ(a) and AZ(b) and produces the azimuth error signal when $|AZ(a)−AZ(b)| > \Delta$, $\Delta$ being a predetermined small value. The azimuth error signal is held in the first hold circuit 43 at step 6 in FIG. 10. When $|AZ(a)−AZ(b)| \leq \Delta$, the elevation error signal is zero. In the similar manner, comparator 34 in the elevation circuit 46 compares EL(e) and EL(f) at step 7 in FIG. 10, and produces the elevation error signal when $|EL(e)−EL(f)| > \Delta$, $\Delta$ being a predetermined small value. The elevation error signal is held in the second hold circuit 44 at step 8 in FIG. 10. When $|EL(e)−EL(f)| \leq \Delta$, the elevation error signal is zero. Then, azimuth and elevation motors 15 and 40 are rotated according to the azimuth and the elevation error signals at step 9 in FIG. 10.

Although the above description has been made in connection with two or four antenna elements, it will be readily understood by those skilled in the art that the present invention is not restricted by the number of antenna elements but can be applied to various numbers of the antenna elements.

What is claimed is:

1. In a tracking system for tracking an electromagnetic energy source which comprises an antenna for receiving the electromagnetic energy, receiver means coupled with the antenna through feeding means for producing a signal of the electromagnetic energy received by the antenna as a receive signal, and moving means for mechanically and angularly moving the antenna so as to point the antenna to the electromagnetic energy source to thereby maximize the receive signal strength, the improvement which comprises:

said antenna being a radiator having an antenna beam which is changeable in direction in response to variation of an electric characteristic in said feeding means;

selection signal generating means for producing a first and a second selection signal alternately;

said feeding means comprising electric variable means which is variable in impedance as the electric characteristic from one to another of a first and a second value, said antenna beam being directed in a first direction when said electric variable means has said first value, said antenna beam being directed in a second direction when said electric variable means has said second value, said first and said second directions having a predetermined small angular difference, said electric variable means having said first and said second values alternately in response to said first and said second selection signals alternately produced to thereby switch said antenna beam from one to the other of said first and said second directions;

detection means coupled with said receiver means for detecting said received signal to produce a detected signal;

processing means coupled with said detection means for deciding the detected signal strength before and after switching of said antenna beam to produce an error signal; and said moving means coupled with said processing means and responsive to said error signal for mechanically and angularly moving said antenna to thereby reduce said error signal.

2. A tracking system as claimed in claim 1, wherein said antenna beam has a pattern which is sharp in azimuth and broad in elevation, said first and said second directions being different from one another in azimuth, said moving means moving said antenna in azimuth.

3. A tracking system as claimed in claim 1, which further comprises decision means coupled with said receiver means for deciding a level of said receive signal to produce a control signal when said receive signal level is lower than a predetermined reference level, means responsive to said control signal for generating a constant driving signal, said moving means angularly moving said antenna in a predetermined rotating direction at a constant speed in response to said constant driving signal.

4. A tracking system as claimed in claim 1, which further comprises oscillating means for oscillating a reference signal having a predetermined frequency, said detection means being coupled with said oscillating means and carrying out a coherent detection of said receive signal by said reference signal to produce said detected signal.

5. A tracking system as claimed in claim 4, which further comprises switching signal generating means coupled with said oscillating means for generating a switching signal synchronous with said reference signal, said selection signal generating means being coupled with said switching signal generating means and generating said first and said second selection signals alternatingly in synchronism with said switching signal, and wherein said processing means comprises:

delivering means coupled with said detection means and said switching signal generating means for delivering said detected signal to a first output as a first detected signal and a second output as a second detected signal alternatingly in synchronism with said switching signal;

first sample and hold means coupled with said first output for sampling said first detected signal and holding a level of said first detected signal as a first level;

second sample and hold means coupled with said second output for sampling said second detected signal and holding a level of said second detected signal as a second level; and comparing means coupled with said first and said second sample and hold means for comparing said first and said second levels to produce a difference of said first and said second levels as said error signal.

6. A tracking system as claimed in claim 5, wherein said antenna comprises a dielectric plate and two antenna elements arranged on said dielectric plate to form a phased array each of the antenna elements being formed in a spiral form as a microstrip line on the dielectric plate.

7. A tracking system as claimed in claim 6, wherein said electric variable means comprises phase shift circuit means comprising impedance elements and diode means, said phase shift circuit means having a first phase constant as said first value when said diode means is not conductive, said phase shift circuit means having a second phase constant as said second value when said diode means is conductive, said selection signal generating means comprising;

biasing means for producing a bias voltage for making said diode means conductive; and switching means coupled with said biasing means and said switching signal generating means for switching off and on said biasing means alternately in response to and in synchronism with said switching signal to deliver no bias voltage as said first selection signal and said bias voltage as said second selection signal to said diode means.

8. In a tracking system for tracking an electromagnetic energy source which comprises an antenna for receiving the electromagnetic energy, receiver means coupled with the antenna through feeding means for producing a signal of the electromagnetic energy received by the antenna as a receive signal, and first and second moving means for mechanically and angularly moving the antenna in azimuth and elevation, respectively, so as to point the antenna to the electromagnetic energy source to thereby maximize the receive signal strength, the improvement which comprises:

said antenna being a radiator having an antenna beam which is changeable in direction in response to variation of an electric characteristic in said feeding means;

selection signal generating means for producing a first, a second, a third, and a fourth selection signal alternately;

said feeding means comprising electric variable means which is variable in impedance as the electric characteristic from one to another of a first, a second, a third, and a fourth value, said antenna beam being directed in a first direction when said electric variable means has said first value, said antenna beam being directed in a second direction when said electric variable means has said second value, said first and said second directions having a predetermined small angular difference in azimuth, said antenna beam being directed in a third direction when said electric variable means has said third value, said antenna beam being directed in a fourth direction when said electric variable means has said fourth value, said third and said fourth directions having a predetermined small angular difference in elevation, said electric variable means having said first, said second, said third, and said fourth values alternatingly in response to said first, said second, said third, and said fourth selection signals alternatingly produced to thereby switch said antenna beam from one to another of said first, said second, said third, and said fourth directions;

detection means coupled with said receiver means for detecting said receive signal to produce a detected signal;

processing means coupled with said detection means for deciding the detected signal strength before and after switching of said antenna beam to produce an azimuth error signal and an elevation error signal;

said first moving means coupled with said processing means and responsive to said azimuth error signal for mechanically and angularly moving said antenna is azimuth to thereby reduce said azimuth error signal; and said second moving means coupled with said processing means and responsive to said elevation error signal for mechanically and angularly moving said antenna in elevation to thereby reduce said elevation error signal.

9. A tracking system as claimed in claim 8, which further comprises oscillating means for oscillating a reference signal having a predetermined frequency, said detection means being coupled with said oscillating means and carrying out a coherent detection of said receive signal by said reference signal to produce said detected signal.

10. A tracking system as claimed in claim 9, which further comprises switching signal generating means coupled with said oscillating means for generating a first and a second switching signal synchronous with said reference signal, said first and said second switching signals having said predetermined frequency and a half of said predetermined frequency, respectively, said selection signal generating means being coupled with said switching signal generating means and generating said first, said second, said third, and said fourth selection signals alternatingly in synchronism with said first switching signal, and wherein said processing means comprises:

first delivering means coupled with said detection means and said switching signal generating means for delivering said detected signal to a first output as a first detected signal and to a second output as a second detected signal alternatingly in synchronism with said first switching signal;

first sample and hold means coupled with said first output for sampling said first detected signal and holding a level of said first detected signal as a first level;

second sample and hold means coupled with said second output for sampling said second detected signal and holding a level of said second detected signal as a second level;

comparing means coupled with said first and said second sample and hold means for comparing said first and said second levels to produce a difference of said first and said second levels as an error signal;

second delivering means coupled with said comparing means for delivering said error signal to a third output as said azimuth error signal and to a fourth output as said elevation error signal.

11. A tracking system as claimed in claim 10, wherein said antenna comprises a dielectric plate and four antenna elements arranged in a matrix form on said dielectric plate to form a phase array, each of the antenna elements being formed in a spiral form as a microstrip line on the dielectric plate.

12. A tracking system as claimed in claim 11, wherein said first value and said third value are a common value, said first direction and said third direction being a common direction, said electric variable means comprising phase shift circuit means comprising impedance elements and first and second diode means, said phase shift circuit means having said common value when both of said first and second diode means are not conductive, said phase shift circuit means having said second value when said first diode means is conductive with said second diode means being not conductive, said phase shift circuit means having said fourth value when said second diode means being conductive with said first diode means being not conductive, said selection signal generating means comprising:

biasing means for producing a bias voltage for making said first and second diode means conductive;

first switching means coupled with said biasing means and said switching signal generating means for switching off and on alternately in response to and in synchronism with said first switching signal to deliver no bias voltage as said first selection signal and said bias voltage as said second selection signal to said first diode means in response to said second switching signal; and second switching means coupled with said biasing means and said switching signal generating means for switching off and on biasing means alternately in response to and in synchronism with said first switching signal to deliver no bias voltage as said third seletion signal and said bias voltage as said fourth selection signal to said second diode means in response to said second switching signal.

* * * * *